June 11, 1935.  G. E. MORGANS  2,004,825
SWIMMING BATH
Filed Oct. 23, 1934    3 Sheets-Sheet 1

June 11, 1935.  G. E. MORGANS  2,004,825
SWIMMING BATH
Filed Oct. 23, 1934  3 Sheets-Sheet 2

Patented June 11, 1935

2,004,825

UNITED STATES PATENT OFFICE 2,004,825

SWIMMING BATH

Godfrey Ewart Morgans, London, England

Application October 23, 1934, Serial No. 749,638
In Great Britain November 11, 1933

8 Claims. (Cl. 4—172)

This invention relates to the construction and arrangement of swimming baths and has for its object the provision of a swimming bath in which the whole of contaminated water contained therein may be removed and replaced by pure water in any predetermined period of time by means of a uniform and constant flow.

According to the invention a swimming bath is provided in its base with a centrally located inlet channel through which water is admitted to the bath, and an outlet channel disposed around the periphery of the bath in (i. e. at or near) the said base. The outlet channel may communicate with an external draw-off or collector conduit located close to but below the normal water level of the bath. The inlet channel may consist of a pipe of, say, metal or earthenware having orifices along its upper side through which the water issues into the bath in an upward stream, or it may consist of a trough located in the base of the bath covered with removable plates or covers constructed say, of metal or earthenware or glass, and formed with holes through which the water enters the bath in an upward stream. This channel may be constructed with suitably varying cross-sectional areas either by widening it or deepening it to correspond with the volume of water flowing through it, and the said orifices may also be suitably varied in cross-sectional area so as to control the rate of flow of water into the bath.

The inlet channel may extend along the base of the bath for the whole or the greater part of its length or it may only so extend for a shorter portion. It may also be formed with one or more branches extending in any desired direction.

The outlet channel, which preferably consists of a trough covered with plates perforated with holes or orifices as in the case of the inlet channel, surrounding partly or in whole the periphery of the bath, or may be a pipe constructed say, of metal or earthenware having holes or orifices pierced through its sides throughout its whole length or part thereof, is connected at a number of points by means of ducts or pipes to a collector or draw-off channel which, in one example of construction, is located around the swimming bath at a level only slightly lower than the top water level of the water in the swimming bath outside its periphery, and under the footway or pavement surrounding the bath. The water may be drawn off from the draw-off channel at one or more points by means of pumps or by gravity according to the particular site and level, and thence passes to a purification and heating plant from which it may be returned to the swimming bath through the inlet channel.

The draw-off or collector channel is preferably made throughout its length of varying cross-section so as to accommodate the varying volume of water passing through it. For instance, at the points near the outlets from the ducts or pipes leading from the outlet channel the cross-sectional area may be proportionately increased, since the volume of water is greater at and after those points owing to the accumulation of water flowing from several ducts. The collector channel may also be made large enough to accommodate pipes for freezing water over the area of the swimming bath if desired.

A scum trough may be provided around the periphery of the bath at a level slightly above the normal top water surface level of the water in the bath, and may be connected to the draw-off or collector channel by suitable ducts through which water lapping over into the scum trough from the bath due to induced or natural wave action, may be passed into the collector channel, carrying with it any scum, froth or the like, which may be present in the water, or such water may be allowed to run to waste. The water if so collected joins the water already received by the collector channel from the outlet channel and is passed to the purification plant.

The floor of the swimming bath may be slightly arched to ensure that any solid matters will gravitate laterally to the peripherally arranged outlet channels. Drainage sinks are provided, and in constructions in which the floor is thus arched, preferably one at each side of the bath at its greatest depth, and connected together by a channel or duct to a sump through which the water may be drawn off by gravity or by means of a pump, for the purpose of draining the swimming bath when required. The said drainage sinks may be connected together by means of a duct passing beneath the floor of the swimming bath and covered with removable plates having orifices if desired in order to allow the entrance of water into the said duct to facilitate the flow of the solid matters into the sump.

The collector channel may be arranged to collect and carry off the water dropped on to the footway or pavement by bathers emerging from the swimming bath, by covering the collector channel with perforated cover plates of metal or earthenware or wood, or other suitable material, which may form the pavement or part thereof, and by suitably sloping the remainder of the pavement towards the collector channel to ensure the gravitational flow of such dropped water into the collector channel.

Suitable grids may be inserted at various points between the outlet channel and the filters to prevent large solid matters in suspension reaching the filter beds.

In order to maintain the regular desired rate of flow of the water and thereby to replace and evacuate the varying volumes of water to be displaced at the varying portions of the swimming bath owing to the varying depths of the swimming bath, either the cross-sectional area of the orifices in the cover plates both of the inlet and of the outlet channels at the said varying portions of the swimming bath, may be varied, or the number of the said orifices increased or decreased in proportion to the volume of water to be displaced at all the said portions of the bath.

Similarly, in order that the varying volumes of water evacuated at varying portions of the bath due to the varying depths may pass through the ducts leading from the outer outlet channel to the collector channel, either the cross-sectional areas of the said ducts may be varied or the number of the ducts for any given length of periphery increased or decreased as required.

The invention will now be described with reference to the forms of construction illustrated, by way of example, in the accompanying drawings, in which:—

Like parts are indicated by the same references throughout the various views.

Figure 1:
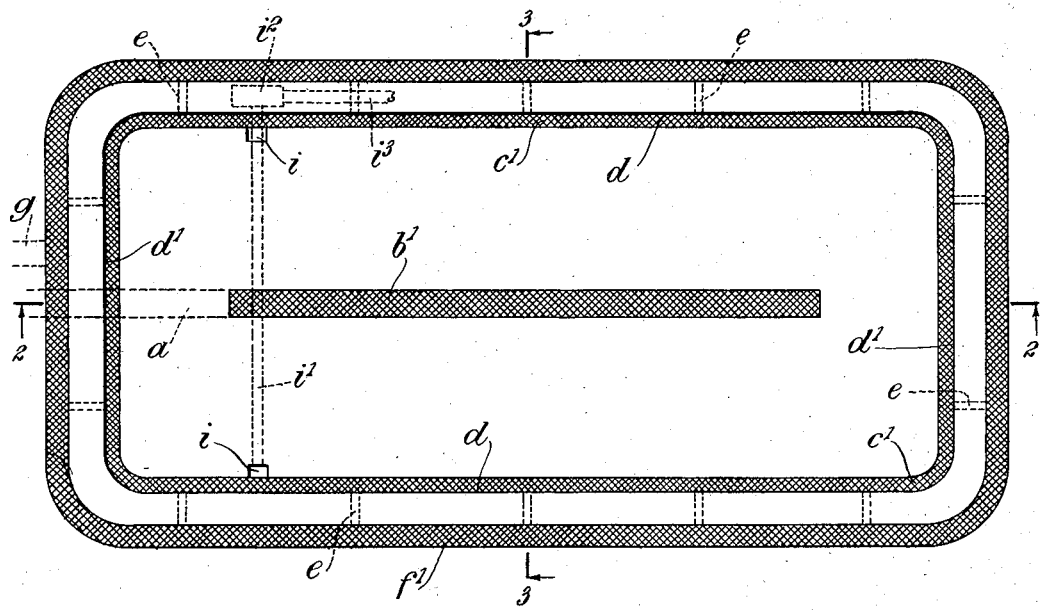
Fig. 1 is a plan view of a bath according to this invention.
Figure 2:
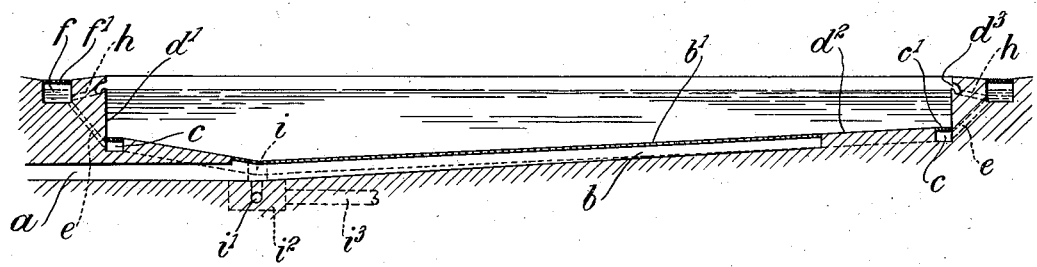
Fig. 2 is a longitudinal section on the line 2—2 in Fig. 1.
Figure 3:
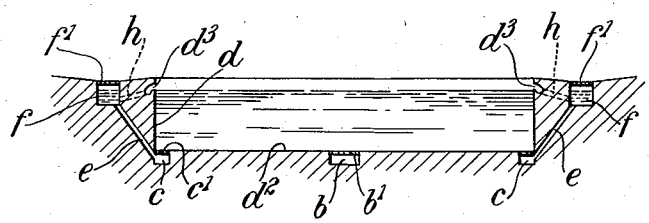
Fig. 3 is a cross-section on the line 3—3 in Fig. 1.

In the construction shown in Figs. 1-3, the inlet conduit $a$ for the purified water supplied to the bath communicates with an inlet channel consisting of a trough $b$ which extends longitudinally in the centre of the base of the bath. This trough $b$ is provided with a removable strainer $b^1$ disposed flush with the base $d^2$ of the bath. The trough $b$ is of progressively decreasing cross-sectional area by tapering it from a point near to the inlet $a$ where the channel is of maximum depth to a point remote from the inlet $a$ where it is of minimum depth, to correspond with the volume of water flowing through the channel at the different points. The inlet channel extends for a greater part of the length of the bath but both of its ends are spaced apart from the ends of the bath.

The outlet channel consists of a trough $c$ extending completely around the periphery of the bath at the base of the side walls $d$ and the end walls $d^1$ of the bath. This outlet trough is covered with removable strainer $c^1$ which is flush with the base $d^2$ of the bath.

Said outlet channel $c$ is communicated at a number of points by means of the upwardly inclined ducts $e$ with a collector channel which is in the form of a trough $f$ disposed externally of the bath, i. e. in the footway $f^1$ surrounding the four sides of the bath, this trough extending to a level only slightly lower than the level of the water in the swimming bath. The footway slopes slightly to the collector channel to ensure drainage of water dropped on to the footway by bathers leaving the bath. The water from the collector channel is drawn off through the outlet $g$ through which it passes to a purification or heating plant before being returned through the inlet channel $a$ to the bath.

The usual scum trough $d^3$ around the periphery of the bath is in communication with the collector channel at a number of points around the bath by means of the ducts $h$. Drainage sinks $i$ are provided at each side of the bath at its greatest depth, these sinks being connected together by a duct $i^1$ to a sump $i^2$ communicating with a drain $i^3$ for the purpose of draining the swimming bath when required.

Figure 4:
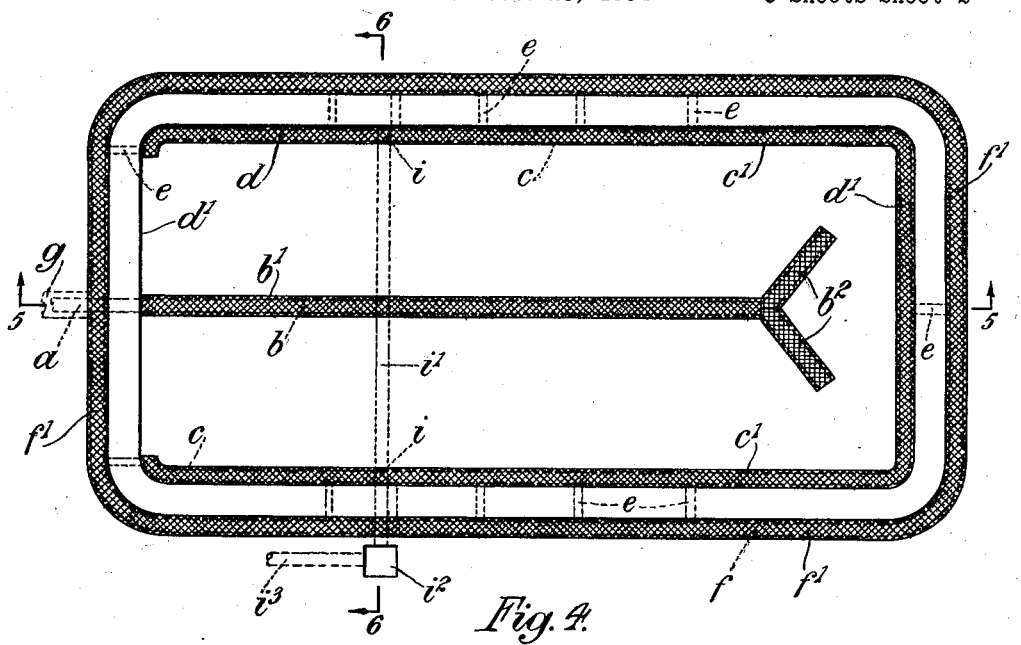
Fig. 4 is a plan view of a modified construction.
Figure 5:
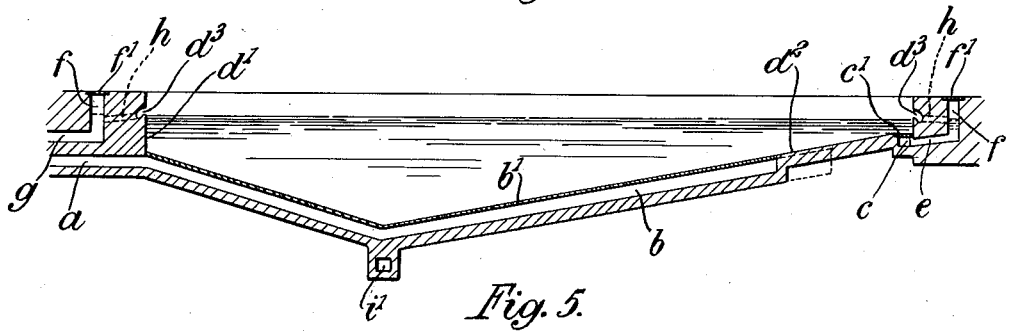
Fig. 5 is a longitudinal section on the line 5—5 in Fig. 4.
Figure 6:
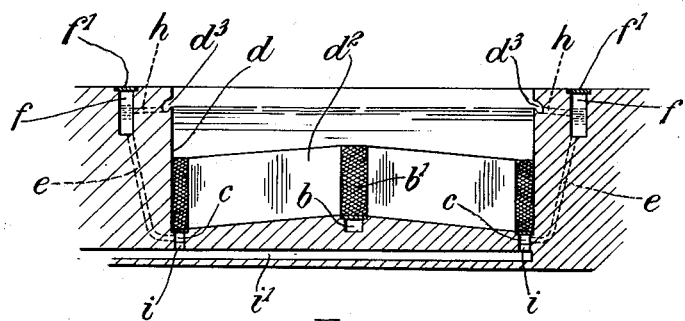
Fig. 6 is a cross-section on the line 6—6 in Fig. 4.

In the construction illustrated in Figs. 4-6, the purified water inlet conduit $a$ communicates at one end of the bath with the trough $b$ forming the inlet channel. In this case, therefore, one end of the trough $b$ and its strainer $b^1$, adjacent the inlet $a$, extends right up to the end wall $d^1$ of the bath, while the other end remote from the inlet $a$ does not extend completely to the opposite end of the bath but is splayed out to provide two branches $b^2$ extending towards the opposite sides of the bath. In this construction, the trough $c$ forming the outlet channel does not extend completely around the periphery of the bath but, at the end of the bath adjacent the inlet $a$, this trough terminates near the sides of the bath. In this construction also, the inlet and outlet passages $a$ and $g$ are arranged one above the other. The base of the bath is also slightly arched to ensure that solid matters will gravitate laterally to the trough $c$ beneath which there are formed the sinks $i$ communicating with the transverse passage $i^1$ in communication with the sump $i^2$ and the drain $i^3$.

Figure 7:
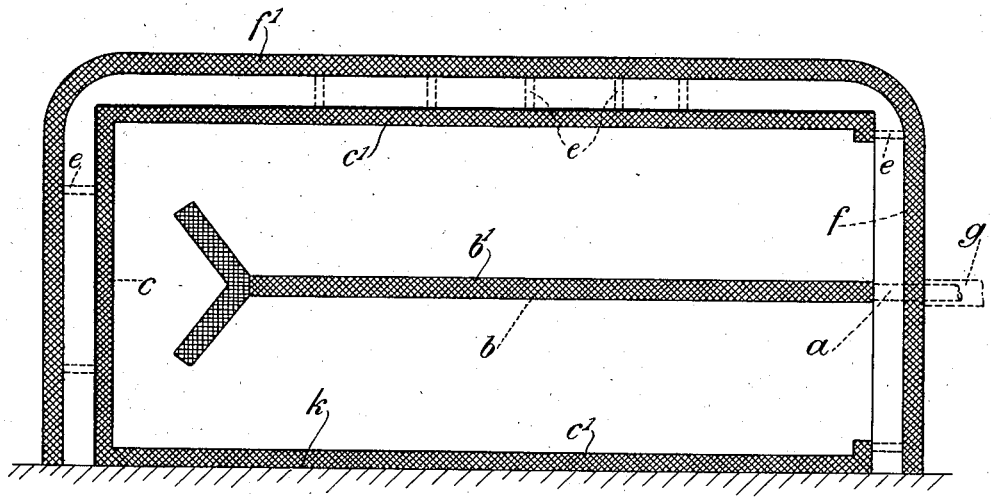
Fig. 7 is a plan view of another modified construction.

The construction illustrated in Fig. 7 is the same as that in Figs. 4-6, except that the collector channel extends around one side and two ends only of the bath, the fourth side abutting on a vertical wall $k$. The water leaving the side of the outlet $c$ adjacent the wall $k$ must, in this case, flow to one end of the bath where it is led through one of the ducts $e$ to the collector channel at this end of the bath.

Figure 8:
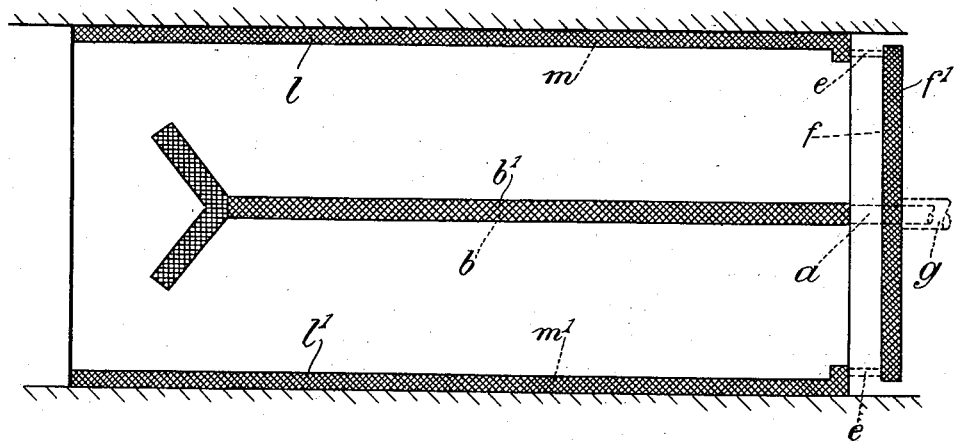
Fig. 8 is a plan view of a further modification.

In the construction illustrated in Fig. 8, the bath is arranged between two walls marked $l$ and $l^1$, one at either of its longitudinal sides and the collector channel $f$ is disposed at one end only of the bath. In this case, the outlet channels $m$ and $m^1$ only extend along two opposite longitudinal sides of the bath and the water is drawn off from these channels at the one end through the ducts $e$.

The operation of the swimming bath and the automatic circulation of the water contained therein is as follows. Purified fresh water enters at the bottom of the bath through the inlet channel $b$, and in the case of warm water rising to the surface, passes by the easiest route to the periphery of the bath, and then downwards to the outlet channel $c$. The flow is materially assisted by natural forces, the hot water issuing from the inlet channel $b$ rising naturally to the surface, and being cooled in its passage to the sides of the bath, sinking naturally to the outlet channel $c$. In the case of cold water the vertical flow from the inlet channel is less rapid and complete as the cold water tends to flow direct to the outlet channel, but nevertheless is efficient. The complete vertical flow of cold water may be induced by blowing air into the water at various points along the length of the inlet channel. By suitably arranging the area of the passages for the flow of water to the inlet and outlet channels, after taking due account of the various pressures and volumes of water to be displaced, due to the varying depths below the surface, the flow of water can be made to be even, regular and constant, out of and into the orifices, and throughout the whole mass of water in the bath.

By means of the balance secured by the level of the collector channel, the only force necessitated to circulate the water in and out of the bath is that required to overcome the inertia of the mass of water and the frictional resistance of the channels and ducts.

Owing to the far greater length of the outlet channel c compared with that of the inlet channel b, the velocity of the water is gradually reduced as it approaches the outlet channel, and consequently the suction action of the water as it enters this channel is negligible, and all danger on this score is absent.

The effect of the method of circulation of water in the swimming bath is to induce a flow outwards from the centre to the sides of the bath, so that all scum is carried to the sides on the surface, and discharged into the scum trough, while all the fine matters suspended in the body of the water are carried with the flow to the outlet channel, and thus removed from the bath.

It will be appreciated that the whole of the water channels and ducts may be built in masonry or concrete, thereby avoiding all danger of corrosion or leaky joints, and the employment of these materials and the arrangement of the parts, is such that in most cases dirt or scum can be easily removed, thus enabling the ducts and channels to be cleaned merely by removal of the strainers, and the application of a scrubbing brush or mop.

Another advantage rests in the fact that the bather entering the water from the side of the bath, carrying with him germs or dirt, encounters a counter flow of water towards the side of the bath which removes the germs or dirt from him and delivers them either into the outlet channel or into the scum trough, but not as in the ordinary swimming bath, into the centre of the bath where they are circulated in the water.

Swimming baths constructed according to the invention enable the whole volume of the water in the swimming bath to be changed in any unit of time merely by varying the speed of the water drawn from and admitted to the swimming bath. Furthermore, the water flows in a closed circuit being used again and again, a factor of great economy in operation.

Instead of connecting the water inlet to the inlet channel at the deep end of the bath as in the constructions illustrated in the accompanying drawings, the inlet may be connected to the inlet channel at the shallow end or at any intermediate point along the length of the inlet channel either from below or from either side of the bath.

What I claim as my invention and desire to secure by Letters Patent is:—

1. A swimming bath having an inlet in the centre of its base, a collector channel disposed externally of said bath slightly below the water level of the bath, an outlet disposed around the periphery of the base of the bath and in communication with said collector channel so as to supply the water leaving said bath to the collector channel and conduits for conducting pure water to the central inlet and for removing impure water from the collector channel.

2. A swimming bath having an inlet trough extending longitudinally in the centre of its base, an outlet disposed around the whole of the periphery of the base of the bath, a collector channel disposed externally of the bath and extending around the whole of the periphery of the bath slightly below its water level, said collector channel being in communication with said outlet and conduits for conducting pure water to the central inlet and for removing impure water from the collector channel.

3. A swimming bath having a central inlet in its base, an outlet disposed around the periphery of the base of the bath, a collector channel disposed externally of said bath slightly below its water level and in communication with said outlet, a footway on at least one side of the bath sloping to the collector channel so as to ensure drainage of water from the footway to said channel, a strainer for said collector channel, and conduits for conducting pure water to the central inlet and for removing impure water from said collector channel.

4. A swimming bath having an inlet extending longitudinally in the centre of the bath, an outlet disposed around the periphery of the base of the bath, conduits for conducting pure water to said inlet and for removing impure water from said outlet, an arched floor sloping from each side of the inlet to the outlet at the longitudinal sides of the bath adapted to allow solid matters to gravitate to the outlet at the sides of the bath, and drainage sinks at each side of the bath through which the water and said solid matters can be drained away.

5. A swimming bath having an inlet extending longitudinally in the centre of the bottom of the bath, an outlet disposed around the periphery of the bottom of the bath, a collector channel slightly below the water level of the bath and in communication with said outlet, a footway around the sides of the bath sloping to the collector channel so as to ensure drainage of water from the footway to said channel, a strainer for said collector channel, conduits for conducting pure water to the central inlet and for removing impure water from said collector channel, an arched floor sloping from each side of the inlet to the outlet at the longitudinal sides of the bath adapted to allow solid matters to gravitate to the outlet and drainage sinks at each side of the bath adapted to permit removal of said solid matters.

6. A swimming bath having an inlet trough extending longitudinally in the centre of the bottom of the bath, an outlet trough disposed around the periphery of the bottom of the bath, a collector trough surrounding the bath, slightly below its water level and in communication at intervals with said outlet, a footway surrounding the bath sloping to the collector trough so as to ensure drainage of water from the footway to said collector trough, strainers for each of said troughs, and conduits for conducting pure water to the inlet trough and for removing impure water from said collector trough.

7. A swimming bath having a central inlet in its bottom, an outlet disposed around the periphery of the bottom of the bath, a collector channel extending around the periphery of the bath slightly below the water level of the bath and in communication with said outlet, a scum trough surrounding the bath, conduits communicating said scum trough with said collector channel, and conduits for conducting pure water to the central inlet and for removing impure water from the collector channel.

8. A swimming bath having an inlet in the centre of its base, outlets disposed around at least two sides of the periphery of the base of the bath, a collector channel disposed externally of said bath and communicating through ducts with said outlets and conduits for conducting pure water to said inlet and for removing impure water from said collector channel, whereby the water is induced to flow outwards from the centre to said two sides of the bath.

GODFREY EWART MORGANS.